US012654758B2

(12) United States Patent
Moinard et al.

(10) Patent No.: US 12,654,758 B2
(45) Date of Patent: Jun. 16, 2026

(54) STEERING WHEEL FOR A VEHICLE, VEHICLE AND ELECTRONIC ASSEMBLY

(71) Applicant: Autoliv Development AB, Vargarda (SE)

(72) Inventors: Fabrice Moinard, Vouzailles (FR); Lukas Plösch, Dachau (DE)

(73) Assignee: Autoliv Development AB, Vårgårda (SE)

( * ) Notice: Subject to any disclaimer, the term of this patent is extended or adjusted under 35 U.S.C. 154(b) by 195 days.

(21) Appl. No.: 18/514,530

(22) Filed: Nov. 20, 2023

(65) Prior Publication Data

US 2024/0317295 A1     Sep. 26, 2024

(30) Foreign Application Priority Data

Mar. 21, 2023    (DE) .......................... 102023107028.2

(51) Int. Cl.
B62D 1/04          (2006.01)
B62D 1/06          (2006.01)
H01H 9/00          (2006.01)

(52) U.S. Cl.
CPC ............. B62D 1/046 (2013.01); B62D 1/065 (2013.01); H01H 9/00 (2013.01)

(58) Field of Classification Search
CPC .. H01H 9/00; H01H 9/02; H01H 9/04; H01H 3/12; H01H 13/00; H01H 13/04; H01H 13/14; H01H 13/50; H01H 2001/50; H01H 2003/0293; H01H 2003/12; H01H 2003/02; H01H 2013/00; H01H 2013/02; H01H 2013/04; H01H 2013/50; H01H 2013/52;

(Continued)

(56) References Cited

U.S. PATENT DOCUMENTS

| 2003/0095383 | A1 | 5/2003 | Kline et al. |
| 2013/0314374 | A1* | 11/2013 | Kim ...................... G06F 3/0443 |
| | | | 345/174 |
| 2019/0373728 | A1* | 12/2019 | Hengel .................... H05K 1/18 |

FOREIGN PATENT DOCUMENTS

| DE | 10205816 | 8/2003 |
| DE | 102013114791 | 6/2015 |

(Continued)

OTHER PUBLICATIONS

DE102013114791 Machine Translation (8 pgs).

(Continued)

*Primary Examiner* — Anthony R Jimenez
(74) *Attorney, Agent, or Firm* — Matthew D. Thayne; Thayne and Davis LLC

(57)          ABSTRACT

A steering wheel for a vehicle is described. This steering wheel comprises a steering wheel body comprising a grounding feature adapted for being connected to the vehicle ground and at least one electronic assembly being secured to the steering wheel body. The electronic assembly comprises an electronic component, a signal terminal and an assembly-side grounding area being electrically connected to a body-side grounding area of the grounding feature of the steering wheel body. In order to ease the assembly process, at least one electrically conductive and resilient contact element extends between the assembly-side grounding area and the first body-side grounding area. This electrically conductive and resilient contact element is under mechanical tension such that it transfers a force between the steering wheel body and the electric electronic assembly.

11 Claims, 3 Drawing Sheets

Figures 1, 2:
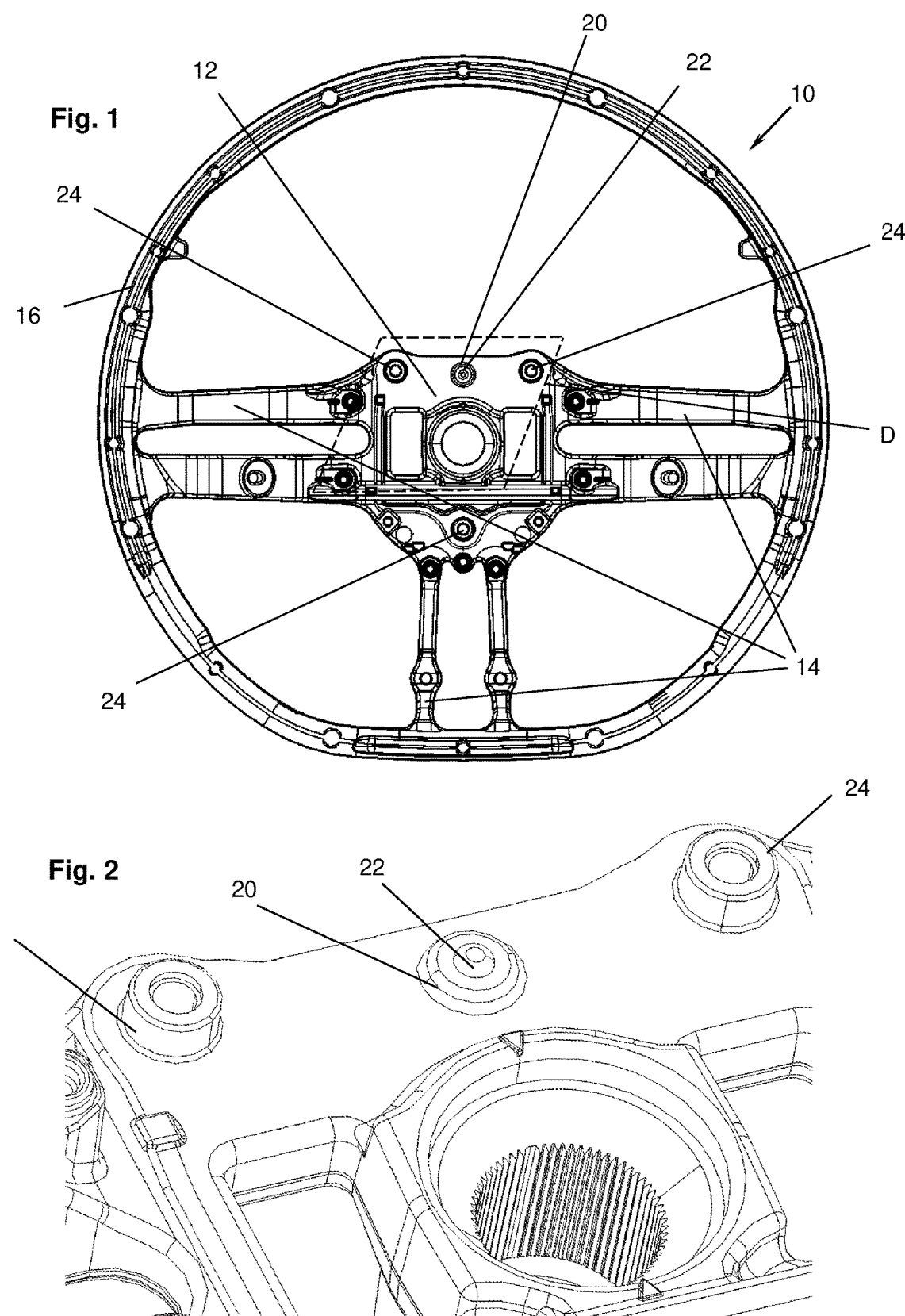

(58) Field of Classification Search
     CPC .... H01H 2239/074; B62D 1/00; B62D 1/046;
            B62D 1/065; B62D 1/06; B60R 21/2037
     USPC ..................................................... 200/61.54
     See application file for complete search history.

(56)                  References Cited

FOREIGN PATENT DOCUMENTS

DE        102017217334      3/2019
DE        102014201577      2/2024

OTHER PUBLICATIONS

DE102014201577 Machine Translation (7 pgs).
DE102017217334 Machine Translation (12 pgs).
DE10205816 Machine Translation (7 pgs).

* cited by examiner

STEERING WHEEL FOR A VEHICLE, VEHICLE AND ELECTRONIC ASSEMBLY

CROSS-REFERENCE TO RELATED APPLICATIONS

This application claims priority pursuant to 35 U.S.C. 119(a) to German Application No. 102023107028.2, filed Mar. 21, 2023, which application is incorporated herein by reference in its entirety.

DESCRIPTION

The invention relates to a steering wheel, to a vehicle comprising such a steering wheel and to an electronic assembly adapted for being mounted to such a steering wheel.

A steering wheel in a modern motor vehicle, especially a passenger car, a truck, a bus or the like does not only serve for steering the vehicle, but also serves as a communication interface comprising switches, lighting elements, sensors and the like. So, a steering wheel comprises a steering wheel body and at least one electronic assembly being secured to this steering wheel body. Such an electronic assembly comprises an electronic component which is most often located inside a housing. The steering wheel body generally comprises a skeleton being made of metal (usually magnesium) and this skeleton can be used as a grounding feature or a part of a grounding feature. The grounding feature (especially the skeleton) is in this case connected to the vehicle ground.

The electronic assembly of course needs to communicate with the electronics of the vehicle, such that the electronic assembly comprises at least one signal terminal, which is adapted for being electrically connected to a harness.

Often, the electronic assembly comprises an assembly-side grounding area that needs to be connected to the vehicle ground and in this case, the grounding feature of the vehicle body comprises a body-side grounding area to which the assembly-side grounding area is connected. The connection between the assembly-side grounding area and the body-side grounding area is in this case established by a grounding wire that can be a part of the harness.

Starting from this prior art it is an object of the invention to improve a steering wheel of the above described type, especially the grounding of the electronic assembly.

This task is solved by a steering wheel. A vehicle comprising such a steering wheel and an electronic assembly adapted for being mounted to a steering wheel body are also described.

According to the invention, at least one electrically conductive and resilient contact element, usually a spring, is provided which extends between the assembly-side grounding area and the first body-side grounding area. This electrically conductive and resilient contact element is initially not biased but is set under mechanical tension when the electronic assembly is mounted to the steering wheel body. During this mounting step, the electronic assembly is usually moved towards the steering wheel body in motion during that the electrically conductive and resilient contact element is tensioned such that a secure grounding of electronic assembly is "automatically" generated during the mechanical mounting process. This has, inter alia, the following advantages: First, a separate assembly step for the grounding is avoided, such that the grounding cannot be forgotten and additionally assembly time is saved. Second, the risk that the electronic component is damaged due to the discharge of a static electrification is reduced, since it is ensured that the grounding is performed during the mechanical assembly which usually takes place prior to the connection of the signal terminal to the harness or direct grounding via a specific wire. Finally, the grounding path is very short such that antenna effects that can cause EMC-problem are reduced.

In a preferred embodiment, the conductive and resilient contact element is a lamella spring with one end being permanently connected to the assembly-side grounding area. This makes the mounting process even more easy and reliable. In a less preferred embodiment, the spring is a coil spring.

As has been mentioned, the grounding feature of the steering wheel body usually comprises a metal skeleton of the steering wheel body. In order to enhance the conductivity of the body-side grounding area, the grounding feature of the steering wheel can further comprise a rivet or screw being attached to the skeleton. This rivet or screw can be coated in order to enhance the electrical contact between the conductive and resilient contact element and the body-side contact area.

As has been mentioned, the electronic assembly usually comprises a housing in which the electronic component is located. This housing preferably consists of an insulating plastic material. Usually it is preferred that the assembly-side grounding area is provided directly on the electronic component such that the housing is not involved in the grounding. In this case, the housing comprises an opening through which the conductive and resilient contact element or the first body-side grounding area extends. The second alternative is generally preferred in order to ensure that the conductive and resilient contact element is not damaged before the electronic assembly is mounted to the steering wheel body. In addition space on the armature is saved because there is no additional grounding tab to add on the armature.

In most cases, the electronic component comprises a printed circuit board and in this case the assembly-side grounding area is a metallic surface area of the printed circuit board. Further, the conductive and resilient contact element can directly be connected to that metallic surface area.

In a relevant application of the invention, the electronic component can be an electronic control unit (ECU) comprising a controller, a micro ECU or microprocessor. This ECU can for example control at least one additional electric and/or electronic assembly and/or receive signals from it. The at least one additional electric and/or electronic assembly can for example be a manually operable switch, a lighting device arranged on the steering wheel, or a touch- or proximity sensor. Often it will be preferred that more than one additional electric and/or electronic assembly is provided with all additional electric and/or electronic assemblies being controlled by the same ECU.

In case that the additional electric and/or electronic assembly is a touch- or proximity sensor, this touch- or proximity sensor can especially be located in a rim of the steering wheel and is in form of a capacitor. It is known to use the capacitor of such a touch- or proximity sensor also as a heating element for the steering wheel. In this case, the capacitor can be supplied with electric energy by a switch being controlled by the ECU when the steering wheel is in a heating mode.

If one of the additional electric and/or electronic assemblies also needs grounding, this grounding will often be provided via a grounding wire being connected to an additional body-side grounding area of the grounding feature remote from the body-side grounding area to which the electrically conductive and resilient contact element is connected.

Figures 3, 4:

The invention will now be described in more detail by means of a preferred embodiment in view of the figures. The figures show:

FIG. 1 a skeleton of a steering wheel body,

FIG. 2 the detail D1 of FIG. 1 in a perspective view,

FIG. 3 an electronic assembly intended for being mounted to the hub of the skeleton shown in FIGS. 1 and 2, FIG. 4 a subassembly of a steering wheel comprising the skeleton shown in FIG. 1, the electronic assembly shown in FIG. 3 and a covering which covers the rim of the skeleton, FIG. 5 a sectional view taken along plane A-A in FIG. 4, FIG. 6 essentially the item shown in FIG. 5 but in a strongly schematic representation, such that only the most essential features of the invention are shown, and FIG. 7 a variation of what is shown in FIG. 6.

FIG. 1 shows the skeleton 10 of a steering wheel body. The skeleton 10 is made of metal, usually magnesium, and is thus mechanically stable as well as electrically conductive. Because the skeleton is electrically conductive, it is also a part of a grounding feature of the steering wheel body being connected to the vehicle ground. The connection to the vehicle ground is not shown since the skeleton 10 is shown in a non-mounted precursor state.

The skeleton 10 of the steering wheel body comprises a hub 12, spokes 14 and a rim 16. Relevant for the invention is especially the hub 12 and a section of this hub is shown in FIG. 2 in more detail.

Especially from FIG. 2, one can see that the hub 12 of the skeleton of the steering wheel body of this embodiment comprises protrusions 24 intended for positioning and/or mounting an electronic assembly which will be described later especially in view of FIG. 3. In other embodiment, other types of positioning and/or mounting elements might be provided.

The upper surface (this is the surface that faces the driver when the steering wheel is installed to a vehicle) comprises a raised portion 20. In the embodiment shown, a rivet 22 is attached to this raised portion 20. The rivet 22 is optional and is mainly used to provide a surface which retains a good conductivity over a large period of time. A screw or similar could be used instead of the rivet. According to the definitions chosen in this application, the rivet 22 (if present) constitutes a part of the grounding feature of the steering wheel body, namely a part of a first body-side grounding area. As mentioned, the rivet is optional and it would also be possible that an area of the skeleton alone forms this first body-side grounding area.

FIG. 3 shows the electronic assembly 40 mentioned before. This electronic assembly 40 comprises a housing 42, which is at least in sections made from at least one plastic material, such that the housing forms an electrically insulating enclosure for at least one electronic component being located inside the housing. As will be described later, this electronic component comprises at least one printed circuit board (PCB). A signal terminal 54 is provided such that the at least one electronic component being located inside the housing 42 can be connected to a harness.

The housing 42 comprises accommodations 44 fitting to the protrusions 24 of the hub 12. In this embodiment, the accommodation 44 are designed as trough holes, such that after positioning the electronic assembly 40 to the hub 12, it can for example be secured to the hub 12 by means of screws extending through the accommodations 44 into the protrusions, which are here in form of hollow cylinders. Alternative solutions to localize and/or attach the electronic assembly to the steering wheel can be considered.

An essential feature is that the housing 42, namely its housing floor, comprises an opening 46, which in this embodiment has the shape of a round hole. One can also see from FIG. 3 that a spring 60—here a leaf spring 60—is located inside the housing 42 behind the opening 46. This spring 60 forms an electrically conductive and resilient contact element. As will be described later in detail, this electrically conductive and resilient contact element extends from an assembly-side grounding area (in the embodiment shown from the assembly-side grounding area of a printed circuit board forming a part of the electronic component being accommodated in the housing 42).

FIG. 4 shows a sub-assembly 5 of a steering wheel comprising the skeleton 10 of FIG. 1, the electronic assembly 40 of FIG. 3 and a covering 30 which covers the rim of the skeleton 10. This covering 30 is usually a foam, which will again be covered by a cladding (for example made of leather or artificial leather) in a subsequent production step. When the steering wheel is completely assembled, the electronic assembly 40 and eventually sections of the spokes 14 can be covered by an airbag module.

The electronic component 50 located inside the housing 42 is or comprises at least a part of an ECU (usually a complete ECU) for additional electric and/or electronic assemblies being a part of the completely assembled steering wheel; these additional electric and/or electronic assemblies are not shown in FIG. 4, especially due to the fact that FIG. 4 only shows a subassembly.

When the electronic assembly 40 is mounted to the hub 12, the raised portion 20 together with the rivet 22 (if present)—the body-side grounding area—enters the housing 42 through the opening 46 such that the spring 60 is pressed onto the body-side grounding area, and a grounding between the electronic component (the PCB 50) of the electronic assembly 40 and the grounding feature of the steering wheel (and thus the vehicle ground) is "automatically" established. In this state, the body-side grounding area, the spring 60 and the assembly-side grounding area are aligned and the spring is under mechanical tension, such that a permanent and stable mechanical and thus electrical connection between the spring and the body-side grounding area is established. This can for example be seen from FIG. 5, which also shows the printed circuit board (PCB) 50 of the electronic component and its assembly-side grounding area 52 from which the spring 60 extends. In the embodiment shown, the spring 60 is fastened to the assembly-side grounding area, such that it cannot get lost during the assembly process.

Figures 5, 6, 7:
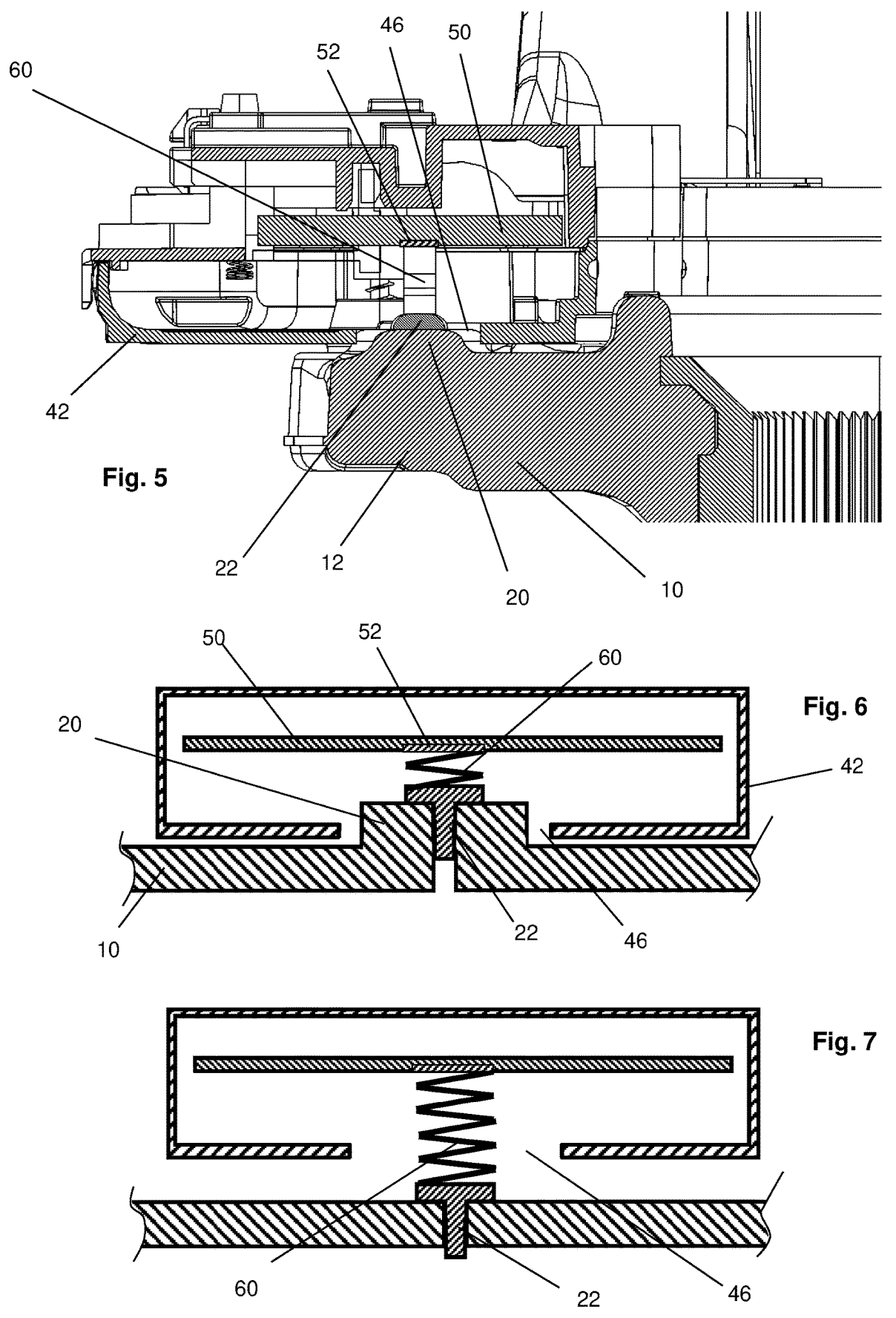

FIG. 6 shows essentially the same as FIG. 5, but in a strongly schematic representation such that only the features relevant for the grounding can be seen. As is indicated in FIG. 6, the spring 60 could also be a coil spring (but this is in most cases not preferred).

As can be seen from FIG. 7, it would also be possible that the spring 60 instead of the body-side grounding area extend through the opening 46, but this is in most cases also not preferred since in this case there is the risk that the spring is damaged before the electronic assembly is mounted to the steering wheel body.

The embodiment disclosed is a preferred one but alternatives can be considered: the orientation of the electronic assembly can be different and it can be located in any area of the steering wheel where a grounding can be achieved. The electronic assembly can also be the screwed, snapped or clipped in various ways as long as the grounding can be effective.

US 12,654,758 B2

5

LIST OF REFERENCE SIGNS 5 steering wheel
10 skeleton of steering wheel body
12 hub
14 spoke
16 rim
20 raised portion of skeleton
22 rivet
24 protrusion
30 covering
40 electronic assembly
42 housing
44 accommodation for protrusion
46 opening in housing bottom
50 PCB of electronic component
52 assembly-side grounding area
54 signal terminal
60 spring

What is claimed is:
1. A steering wheel for a vehicle, said steering wheel comprising:
a steering wheel body comprising a grounding feature adapted for being connected to the vehicle ground, said grounding feature comprising a body-side grounding area,
at least one electronic assembly being secured to the steering wheel body, said electronic assembly comprising an electronic component, a signal terminal and an assembly-side grounding area being electrically connected to the body-side grounding area of the grounding feature of the steering wheel body, and
at least one electrically conductive and resilient contact element extending between the assembly-side grounding area and the first body-side grounding area, said electrically conductive and resilient contact element being under mechanical tension such that it transfers a force between the steering wheel body and the electronic assembly, wherein the at least one electronic assembly comprises a plastic housing in which the electronic component is located, and wherein the electronic component comprises the assembly-side grounding area from which the at least one electrically conductive and resilient contact element extends and wherein the plastic housing comprises an opening through which the at least one electrically conductive and resilient contact element or the body-side grounding area extends.
2. The steering wheel of claim 1, wherein the electrically conductive and resilient contact element is a spring.
3. The steering wheel of claim 1, wherein the grounding feature of the steering wheel body comprises a metal skeleton of the steering wheel.
4. The steering wheel of claim 3, wherein the grounding feature of the steering wheel body further comprises a rivet or screw being attached to the skeleton, said rivet or screw forming at least a part of the body-side grounding area.
5. The steering wheel of claim 1, wherein the electronic component comprises a printed circuit board.
6. The steering wheel of claim 5, wherein the assembly-side grounding area is a metallic surface area of the printed circuit board.
7. The steering wheel of claim 1, wherein the electronic component comprises an ECU which controls and/or receives signals from at least one additional electric and/or electronic assembly being selected from the group comprising: a manually operable switch, a lighting device arranged on the steering wheel, and a touch- or proximity sensor.
8. The steering wheel of claim 7, wherein the at least one additional electric and/or electronic assembly is grounded via a grounding wire.
9. The steering wheel of claim 8, wherein the grounding wire is connected to an additional body-side grounding area of the grounding feature remote from the body-side grounding area.
10. The steering wheel of claim 7, wherein the steering wheel comprises at least one touch- or proximity sensor being controlled by and/or sending signals to the ECU, said touch- or proximity sensor being located in a rim of the steering wheel.
11. The steering wheel of claim 10, wherein the touch- or proximity sensor is arranged as a capacitor, said capacitor being supplied with electric energy by a switch being controlled by the ECU when the steering wheel is in a heating mode.

* * * * *